Nov. 20, 1934.  F. D. HERRINGTON  1,981,451
POTATO SLICER
Filed Feb. 21, 1933  2 Sheets-Sheet 2
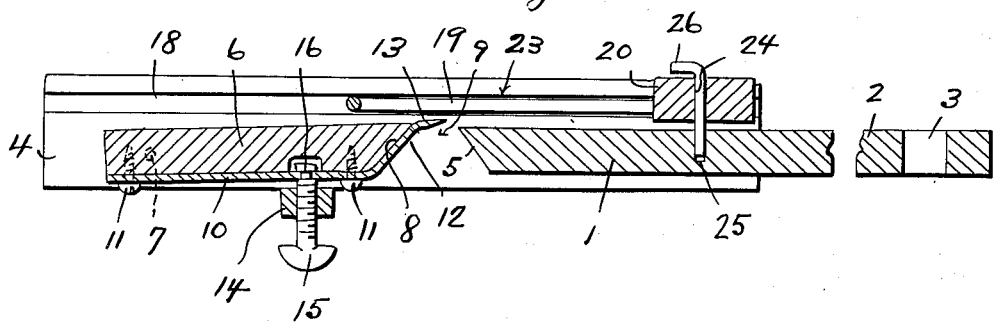
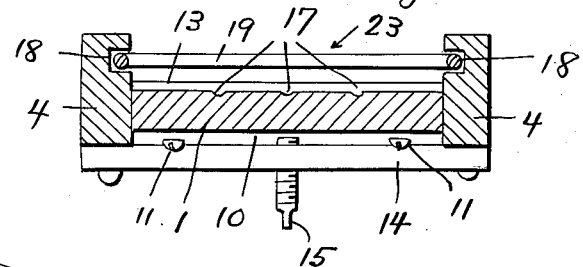
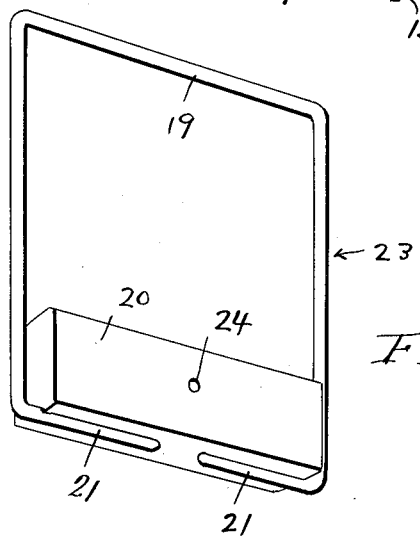
Inventor
F. D. Herrington
By Clarence A. O'Brien
Attorney Patented Nov. 20, 1934

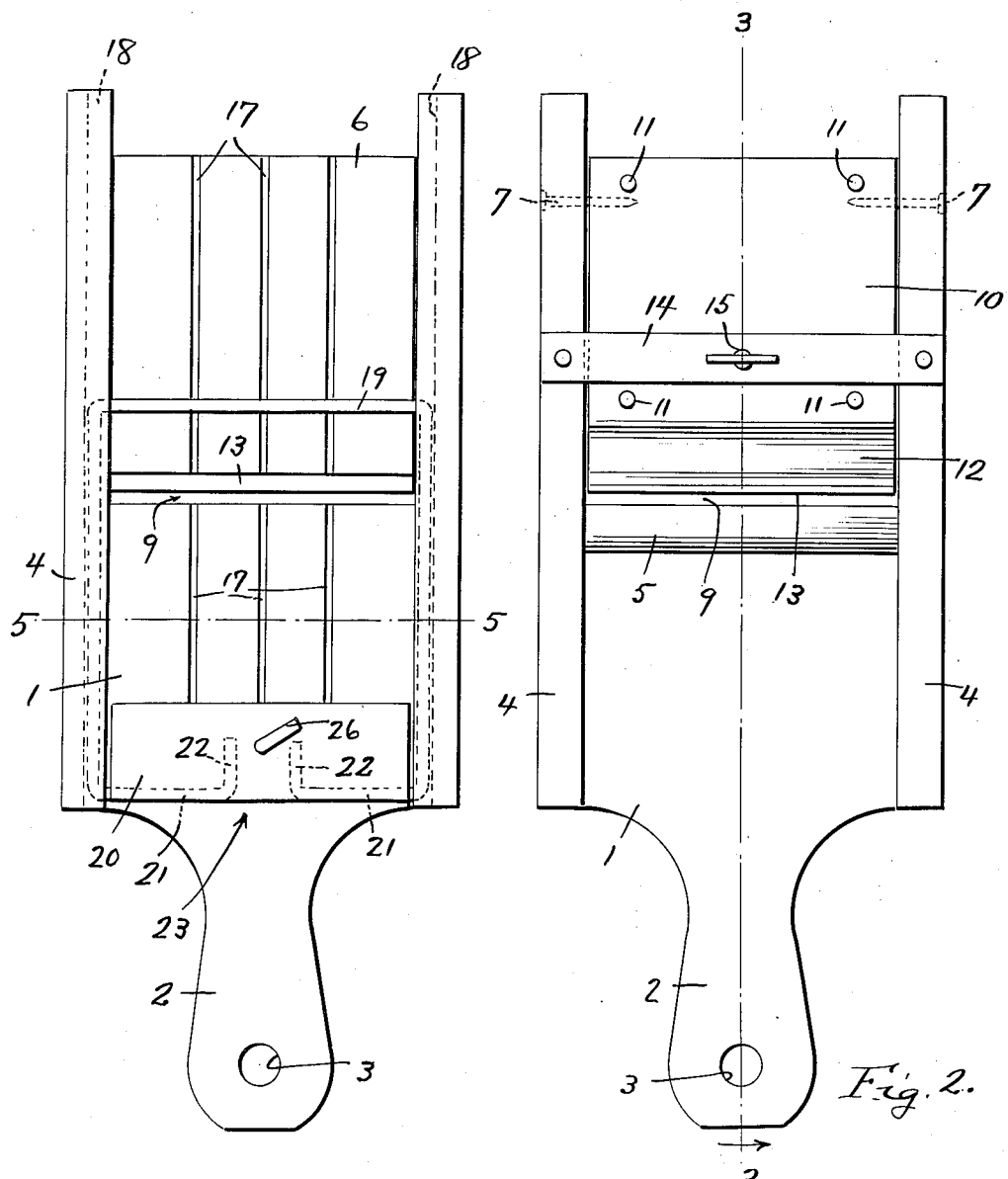

1,981,451

UNITED STATES PATENT OFFICE 1,981,451

POTATO SLICER

Fredrick D. Herrington, Caddo, Tex.

Application February 21, 1933, Serial No. 657,849

1 Claim. (Cl. 146—168)

The present invention relates to new and useful improvements in slicers for fruits and vegetables, particularly potatoes, and has for one of its important objects to provide, in a manner as hereinafter set forth, a slicer of this character embodying a novel construction, combination and arrangement of parts through the medium of which slices of any thickness within a given range may be had.

Another important object of the invention is to provide a slicer of the type including a blade, together with novel means for pushing the potato across said blade and then retrieving said potato.

Other objects of the invention are to provide a fruit or vegetable slicer of the character set forth which will be simple in construction, strong, durable, highly efficient and reliable in use, light, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in top plan of a slicer constructed in accordance with the present invention.

Figure 2 is a view in bottom plan thereof.

Figure 3 is a view in vertical longitudinal section, taken substantially on the line 3—3 of Figure 2.

Figure 4 is a detail view in perspective of the fruit or vegetable actuating means.

Figure 5 is a view in vertical transverse section, taken substantially on the line 5—5 of Figure 1.

Referring now to the drawings in detail, it will be seen that the embodiment of the present invention which has been illustrated comprises a board 1 from one end of which an integral handle 2 extends, said handle 2 having an opening 3 therein to permit the slicer to be conveniently hung on a nail, hook or other support.

Secured on the longitudinal edges of the board 1 are side bars 4 which rise above said board and which project longitudinally beyond the forward end of the board. The reference numeral 6 designates a board which is pivotally mounted at its forward end, as at 7, for swinging adjustment in a vertical plane between the side bars 4, the rear end of said board 6 being beveled, as at 8, and spaced from the board 1 in a manner to provide a transverse slot or opening 9.

A metallic plate 10 is secured, as by screws 11, on the lower side of the adjustable board 6, said plate including an upturned rear end portion 12 abutting the beveled end 8 and terminating in a rearwardly directed blade 13 which projects through the transverse slot or opening 9. A bar 14 is mounted transversely on the lower edges of the side bars 4 beneath the plate 10 and threaded through said bar 14 is an adjusting screw 15 which is rotatably anchored to the plate 10, as at 16. As best seen in Figure 1 of the drawings, the boards 1 and 6 are provided, in their upper sides, with substantially longitudinally aligned grooves 17.

Longitudinal channels 18 are provided in the upper portions of the opposed sides of the bars 4. Slidable in the channels 18 is a retriever 19 of suitable material, preferably heavy wire, upon the rear end of which is mounted a pusher 20 which is substantially in the form of a transversely elongated block. The retriever 19 is substantially U-shaped, as shown, the sides or legs thereof being engaged in the channels 18. The retriever 19 includes inturned portions 21 which are countersunk in the rear face of the pusher 20 and which terminate in forwardly directed end portions 22 which are engaged in sockets provided therefor in the pusher 20. The elements 19 and 20 constitute a slidable operating unit which is designated generally by the reference numeral 23 and which is illustrated to advantage in Figure 4 of the drawings. The pusher 20 is carried by the retriever 19 for reciprocating movement above the board 1. The pusher 20 has extending vertically therethrough an opening 24 which is adapted to be brought into alignment with a socket 25 in the board 1 for accommodating a removable pin 26 for releasably locking the unit 23 against movement when desired.

In use, the blade 13 is adjusted as desired through the medium of the screw 15, the pin 26 is removed and the unit 23 is retracted after which the fruit or vegetable is placed on the board 1 within the unit 23. The slicer is preferably held in one other hand by the handle 2 while the hand is used to reciprocate the unit 23, a finger of said other hand being utilized to apply limited downward pressure on the fruit or vegetable as it is sliced. As the unit 23 is moved forwardly, the pusher 20 forces the fruit or vegetable across the slicing blade 13 and the slice which has thus been cut is directed downwardly by the portion 12 of the plate 10 and may drop into a suitable receptacle which may be provided beneath the slicer. In fact, if desired, the slicer may rest on top of a receptacle. The unit 23 is then retracted, the retriever 19 then engaging the fruit or vegetable and returning it to the board 1 for the next stroke.

The aligned longitudinally grooves 17 in the upper sides of the board 1 and board 6 are material in that they supply air to the smooth surface of the potato to prevent it from sticking to the slicing means, particularly when the slices are thin as in making potato chips for family use. It will also be noticed that the side bars of the retriever 19 serve the additional function of runners for movement in the channels 18, thereby contributing to the simplicity and inexpensiveness of the device.

It is believed that the many advantages of a slicer constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

The potato slicer described comprising essentially, a board having a handle at its rear end and longitudinal grooves in its upper side extending to its forward end and also having side portions extending upwardly above its upper side and longitudinally forward beyond its forward end, said portions with longitudinal channels at their inner sides, a board pivotally connected to and between said side portions of the first-named board and having longitudinal grooves in its upper side extending to its rear end and also having said rear end spaced in front of the forward end of the first-named board, a plate carried at the underside and rear end of the second-named board and connected to said board and having a slicing blade at its rear end, a cross-bar connected to and bridging the space between the lower edges of said side portions, an adjusting screw bearing in said cross-bar and connected in swivelled manner to the plate at the underside of the second-named board, and a retriever slidable above the longitudinally grooved boards and including a rear block and a cross bar spaced in front of the block for the positioning of a potato between the two and also including longitudinal side bars movable rectilinearly in the channels of the side portions and terminating at their rear ends in inwardly directed portions fixed to the block.

FREDRICK D. HERRINGTON.